(12) United States Patent
Huybrechts et al.

(10) Patent No.: US 10,519,336 B2
(45) Date of Patent: Dec. 31, 2019

(54) COATING COMPOSITIONS INCLUDING A POLYISOCYANATE CHAIN EXTENDED NH FUNCTIONAL PREPOLYMER

(71) Applicant: AXALTA COATING SYSTEMS IP CO., LLC, Wilmington, DE (US)

(72) Inventors: Jozef Theresia Huybrechts, Turnhout (BE); Charlotte Enkisch-Krug, Hagen (DE); Leen Tanghe, Kontich (BE); Carmen Flosbach, Wuppertal (DE); Ann Vaes, Putte (BE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 50 days.

(21) Appl. No.: 14/885,329

(22) Filed: Oct. 16, 2015

(65) Prior Publication Data
US 2017/0107397 A1 Apr. 20, 2017

(51) Int. Cl.
C08G 18/38 (2006.01)
C08G 18/75 (2006.01)
C08L 75/02 (2006.01)
C09D 135/02 (2006.01)

(52) U.S. Cl.
CPC ....... C09D 135/02 (2013.01); C08G 18/3821 (2013.01); C08G 18/755 (2013.01); C08L 75/02 (2013.01)

(58) Field of Classification Search
CPC .............. C09D 135/02; C09D 175/02; C08G 18/3821; C08G 18/755; C08L 75/025
See application file for complete search history.

(56) References Cited

U.S. PATENT DOCUMENTS

| 5,126,170 A | 6/1992 | Zwiener et al. |
|---|---|---|
| 5,633,336 A | 5/1997 | Gras et al. |
| 2002/0002300 A1* | 1/2002 | Roesler ................. C08G 18/10 560/25 |
| 2007/0016085 A1 | 7/2007 | Barancyk et al. |
| 2008/0141903 A1* | 6/2008 | Barancyk ............... C08G 18/12 106/287.3 |
| 2009/0226645 A1 | 9/2009 | Shaffer et al. |

FOREIGN PATENT DOCUMENTS

| CA | 2048444 C | 2/1992 |
|---|---|---|
| WO | 2005073188 A1 | 8/2005 |
| WO | 2009086026 A1 | 7/2009 |
| WO | 2013098186 A1 | 7/2013 |

OTHER PUBLICATIONS

EPO, Extended European Search Report issued in Application No. 16186429.3, dated Mar. 15, 2017.

* cited by examiner

*Primary Examiner* — Patrick D Niland
(74) *Attorney, Agent, or Firm* — Lorenz & Kopf, LLP

(57) ABSTRACT

This disclosure relates to a coating composition including a polyisocyanate chain extended NH functional pre-polymer, a method for coating of a metallic or plastic substrate as well as the use of the polyisocyanate chain extended NH functional pre-polymer for improving the adhesion of a coating composition on a metallic or plastic substrate and/or for improving the adhesion between two adjacent layers of multiple layers and the use of the coating composition in a one-component coating composition or two-component coating composition.

12 Claims, No Drawings

COATING COMPOSITIONS INCLUDING A POLYISOCYANATE CHAIN EXTENDED NH FUNCTIONAL PREPOLYMER

TECHNICAL FIELD

This disclosure relates to a coating composition including a polyisocyanate chain extended NH functional prepolymer, a method for coating of a metallic or plastic substrate as well as the use of the polyisocyanate chain extended NH functional prepolymer for improving the adhesion of a coating composition on a metallic or plastic substrate and/or for improving the adhesion between two adjacent layers of multiple layers and the use of the coating composition in a one-component coating composition or two-component coating composition.

BACKGROUND

Some coating compositions are known in the art and are used in a great variety of applications such as for primers, base coats and clear coats in vehicle original coatings and vehicle repair coatings. In this regard, great efforts have been made to develop coating compositions imparting the desired properties to the substrate or article to be coated. For example, coatings have been developed for e.g. protecting against abrasion, chemicals, corrosion, heat or mechanical impact. Furthermore, in vehicle repair coatings, there is an increasing demand in the market for fast drying coating compositions at room temperature.

In this regard, aspartate based coating compositions are well known in the art. For example, EP 0 403 921 describes coating compositions with binders based on a polyisocyanate component and an isocyanate-reactive component containing specific secondary polyamines. These secondary polyamines are also called polyaspartic acid derivatives and are based on reaction products of primary polyamines and diesters of maleic and/or fumaric acid. EP 0 470 461 also describes coating compositions for vehicle refinish applications containing a polyisocyanate component and an isocyanate-reactive sterically hindered diamine prepared from 3,3'-dimethyl 4,4'-diamino dicyclohexylmethane and maleic diethylester. The isocyanate-reactive component further contains a hydroxyl-functional poly(meth)acrylate or mixtures of hydroxyl functional poly(meth)acrylates and polyesterpolyols. WO 2005/073188 refers to aspartates which are prepared by first reacting a di- or polyamine with an unsaturated ester and then reacting the resultant product with a maleimide. U.S. Pat. No. 5,633,336 A refers to low-viscosity (cyclo)-aliphatic polyamines containing urea groups and having more than two amino groups that may be prepared by reacting (cyclo)aliphatic diamines with polyisocyanates containing isocyanurate groups or biuret groups. Such polyamines are useful as components in PUR reaction finishes and coating and adhesive compositions. WO 2013/098186 A1 refers to an aqueous urethane resin composition consisting mainly of the following (A) component and containing the following (B) and (C) components: (A) hydrophilic polyol, (B) water dispersible polyisocyanate, (C) aspartic acid ester having a secondary amino group. WO 2009/086026 discloses a transparent organic solvent-based clear coat coating composition including at least one binder with functional groups containing active hydrogen, in particular hydroxyl groups, at least one polyisocyanate cross-linking agent with free isocyanate groups and at least one epoxy-functional silane. US 2009/0226645 A1 refers to coating composition including as component I, a) a polyaspartic acid ester including the reaction product of one more diamines, one or more difunctional acrylate-containing compounds and one or more maleic/fumaric acid esters; b) at least one moisture scavenger; c) at least one deaerator; d) at least one plasticizer; and e) optionally additives; and as component II, one or more polyisocyanates. US2007/160851 A1 refers to coating compositions including a polyurea formed from a reaction mixture including isocyanate and a (meth)acrylated amine, wherein the (meth)acrylated amine is the reaction product of a polyamine and a (meth)acrylate; when the (meth)acrylate includes a poly(meth)acrylate, the reaction product further includes a mono(meth)acrylate and/or a monoamine.

The above coating compositions possess fast curing times. However, if a di- or polyamine is reacted with a fumarate diester, the reaction times are very slow which causes strong discoloration in the obtained reaction product and coating compositions prepared therefrom. Moreover, unreacted fumarate diester causes further disadvantages as it remains as a non-reactive component in the final formulation. The disadvantages are reflected by an overall worsening in the balance of potlife and drying performance versus substrate and/or intercoat adhesion. The same discoloration and disadvantages of the reaction products and coating compositions prepared therefrom are obtained in case a maleate diester is reacted with a di- or polyamine as the reaction typically goes partially through fumarate diester isomerisation. Thus, the balance of potlife of these coating compositions and properties such as substrate adhesion and/or intercoat adhesion after application/drying as well as color and/or color stability of the liquid paint are not sufficient for certain applications.

Thus, the object of the present disclosure is to provide a coating composition having a well-balanced drying performance, i.e. fast curing times at a sufficient potlife, in some embodiments a potlife of at least 30 min at room temperature, mechanical properties such as substrate adhesion and intercoat adhesion in a multi-layer structure, abrasion, chemical and corrosion resistance, and optical properties, such as a low initial color and good color stability of the liquid paint.

BRIEF SUMMARY

This disclosure relates to a coating composition including a polyisocyanate chain extended NH functional pre-polymer, wherein the polyisocyanate chain extended NH functional pre-polymer
  a) is free of isocyanate groups,
  b) has an NH equivalent weight of from 300 to 5,000 g, and
  c) is a reaction product of at least one polyisocyanate with a NH functional pre-polymer, wherein the NH functional pre-polymer is a reaction product of a compound having at least one primary amine group and at least one di-substituted maleate and/or di-substituted fumarate and at least one acrylate- and/or methacrylate-containing compound with a molar ratio of the at least one di-substituted maleate and/or di-substituted fumarate to the at least one acrylate- and/or methacrylate-containing compound from 1:10 to 10:1.

The present disclosure is also directed to a method for coating of a metallic or plastic substrate, the method including at least the steps of:
  a) applying the coating composition as defined herein to at least a portion of a metallic or plastic substrate to be coated, and
  b) curing the coating composition of step a).

The present disclosure is further directed to the use of a polyisocyanate chain extended NH functional pre-polymer as defined herein for improving the adhesion of a coating composition on a metallic or plastic substrate and/or for improving the adhesion between two adjacent layers of multiple layers, wherein at least one of the adjacent layers includes the polyisocyanate chain extended NH functional pre-polymer. The present disclosure is still further directed to the use of the coating composition as defined herein in a one-component coating composition or two-component coating composition.

It has been found out that according to the present disclosure, coating compositions can be formulated having a well-balanced drying performance, i.e. the coating composition provides fast curing times at sufficient long potlife, in some embodiments a potlife of at least 30 min at room temperature. It has further been found out that such a coating composition being applied and cured on a substrate, such as a metallic or plastic substrate, further provides excellent mechanical properties with regard to substrate adhesion and intercoat adhesion in a multi-layer structure, abrasion, chemical and corrosion resistance. Still further, it has been found out that such a coating composition has excellent optical properties such as color stability of the liquid paint. Thus, the coating composition according to the present disclosure provides an excellent balance of drying performance, mechanical properties as well as optical properties. In particular, this is achieved by providing a coating composition including a defined polyisocyanate chain extended NH functional pre-polymer.

DETAILED DESCRIPTION

The disclosure is set forth in greater detail as follows.

It will be appreciated that certain features of the disclosure which are, for clarity, described above and below in the context of separate embodiments may also be provided in combination in a single embodiment. Conversely, various features of the disclosure that are, for brevity, described in the context of a single embodiment may also be provided separately or in any sub-combination. In addition, references in the singular may also include the plural (for example, "a" and "an" may refer to one, or one or more) unless the context specifically states otherwise.

Unless stated otherwise, all molecular weights (both number and weight average molecular weight) referred to herein are determined by GPC (gel permeation chromatography) using polystyrene as the standard and tetrahydrofurane as the liquid phase eluent.

The coating compositions according to the disclosure are liquid coating compositions including a liquid carrier. The liquid carrier may be water and/or one or more organic solvents. Therefore, the coating composition can be water-based or organic solvent-based.

Water-based coating compositions are coating compositions, wherein water is used as solvent or thinner when preparing and/or applying the coating composition. Usually, water-based coating compositions may contain, for example, 30 to 90% by weight of water, based on the total amount of the coating composition and optionally, up to 30% by weight, in some embodiments, below 15% by weight of organic solvents, based on the total amount of the coating composition.

Organic solvent-based coating compositions are coating compositions, wherein organic solvents are used as solvents or thinners when preparing and/or applying the coating composition. Usually, solvent-based coating compositions contain, for example, 20 to 90% by weight of organic solvents, based on the total amount of the coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, glycols, for example, ethylene glycol, propylene glycol or butyl glycol, N-methyl pyrrolidone such as N-methyl pyrrolidone and N-ethyl pyrrolidone, and ketones, e.g., methyl ethyl ketone, acetone, methyl isobutyl ketone, cyclohexanone; aromatic or aliphatic hydrocarbons, for example, toluene, xylene, or straight-chain or branched aliphatic C6-C12-hydrocarbons, aliphatic hydrocarbons like hexane, heptane, dodecane, mineral spirits, esters such as methyl-, ethyl-, propyl-, iso-propyl-, n-butyl-, iso-butyl-, tert-butyl-, hexyl-acetate, propionate or butyrate, ethers such as tetrahydrofuran, methylal, ethylal, butylal, diethylether, dibutylether, ether-ester solvents such as ethyleneglycol monobutylether acetate, propylene glycol, ethylene glycol, glycerin, monoethylether acetate, and the like. Exemplary solvents are esters such as methyl-, ethyl-, propyl-, isopropyl-, n-butyl-, iso-butyl-, tert-butyl-, hexyl-acetate, propionate or butyrate and ether-esters such as ethyleneglycol monobutylether acetate, propylene glycol, monoethylether acetate, and the like.

The individual components of the coating composition according to the disclosure are explained in greater detail below.

In an embodiment, one aspect of the present coating composition is that it includes a polyisocyanate chain extended NH functional pre-polymer. It is appreciated that the polyisocyanate chain extended NH functional pre-polymer is a reaction product of at least one polyisocyanate with a NH functional pre-polymer.

It is appreciated that the NH functional pre-polymer is a reaction product of a compound having at least one primary amine group and at least one di-substituted maleate and/or di-substituted fumarate and at least one acrylate- and/or methacrylate-containing compound.

For example, the compound having at least one primary amine group is one kind of a compound having at least one primary amine group. Alternatively, the compound having at least one primary amine group includes, in some embodiments consists of, two or more kinds of a compound having at least one primary amine group. In some embodiments, the compound having at least one primary amine group is one kind of a compound having at least one primary amine group.

It is appreciated that the expression "at least one" primary amine group means that the compound may include one or more primary amine group(s).

For example, the compound includes one primary amine group. Alternatively, the compound includes two or more primary amine groups. In some embodiments, the compound includes two or three primary amine groups, like two primary amine groups.

In one embodiment of the present disclosure, the compound includes two primary amine groups. Thus, the compound having at least one primary amine group is in some embodiments a diamine such as a primary diamine.

In one embodiment of the present disclosure, the compound having at least one primary amine group is one kind of a diamine. Alternatively, the compound having at least one primary amine group includes, in some embodiments consists of, two or more kinds of diamines. For example, the compound having at least one primary amine group includes, in some embodiments consists of, two or three kinds of diamines.

In some embodiments, the compound having at least one primary amine group is one kind of a diamine.

The term "diamine" in the meaning of the present disclosure refers to a compound having two amino functional groups. Further, the term "primary" refers to an amino functional group in which one of three hydrogen atoms in ammonia is replaced by an aliphatic, cycloaliphatic, such as mono- or bicycloaliphatic, arylalkyl or aryl group.

Thus, the compound having at least one primary amine group is in some embodiments a diamine being selected from the group including aliphatic diamines such as ethylene diamine, 1,2-diaminopropane, 1,4-diaminobutane, 1,3-diaminopentane, 1,6-diaminohexane, 2,5-diamino-2,5-dimethylhexane, 2,2,4- and 2,4,4-trimethyl-1,6-diaminohexane, 1,11-diaminoundecane, 1,12-diaminododecane, diethylenetriamine, triethylenetetramine, 2-methyl-1,5-pentanediamine, 2-[2-(2-aminoethoxy)ethoxy]ethylamine, 3-[2-(3-aminopropoxy) ethoxy]propylamine, 3-[3-(3-aminopropoxy)propoxy]propylamine, 3-[4-(3-amino-propoxy) butoxy]propylamine, 3-{2-[2-(3-aminopropoxy)ethoxy] ethoxy}propylamine and cycloaliphatic, such as mono- or bicycloaliphatic, and/or arylalkyl diamines such as 1,3- and 1,4-cyclohexane diamine, 5-amino-1,3,3-trimethyl-cyclohexanemethanamine (IPDA), norbornyldiamine, 2,4- and 2,6-hexahydrotoluylene diamine, 2,4'- and 4,4'-diamino-dicyclohexyl methane and 3,3'-dialkyl-4, 4'-diaminodicyclohexylmethanes, 3, 3'-dimethyl-4, 4'-diaminodicyclohexyl methane and 3,3'-diethyl-4,4'-diaminodicyclohexylmethane, 1,3- and 1,4 xylylenediamine, tetramethyl xylylenediamine, and mixtures thereof.

In one embodiment, the compound having at least one primary amine group is in some embodiments a compound including a cycloaliphatic, such as a mono- or bicycloaliphatic, ring structure.

In some embodiments, the compound having at least one primary amine group is a diamine being selected from cycloaliphatic, such as a mono- or bicycloaliphatic, and/or arylalkyl diamines such as 1,3- and 1,4-cyclohexane diamine, 5-amino-1,3,3-trimethyl-cyclohexanemethanamine (IPDA), norbornyldiamine, 2,4- and 2,6-hexahydrotoluylene diamine, 2,4'- and 4,4'-diamino-dicyclohexyl methane and 3,3'-dialkyl-4, 4'-diaminodicyclohexylmethanes, 3, 3'-dimethyl-4, 4'-diaminodicyclohexyl methane and 3,3'-diethyl-4,4'-diaminodicyclohexylmethane, 1,3- and 1,4 xylylenediamine, tetramethyl xylylenediamine, and mixtures thereof.

More in some embodiments, the compound having at least one primary amine group is a diamine being a cycloaliphatic, such as a mono- or bicycloaliphatic, diamine such as 1-amino-3,3,5-trimethyl-5-aminomethylcyclohexane (IPDA), norbornyldiamine, 2,4'- and 4,4'-diaminodicyclohexyl methane (PACM) and 3,3'-dialkyl-4, 4'-diaminodicyclohexylmethanes, such as 3, 3'-dimethyl-4, 4'-diaminodicyclohexyl methane and 3,3'-diethyl-4,4'-diaminodicyclohexylmethan and mixtures thereof. More in some embodiments, the compound having at least one primary amine group is 1-amino-3,3,5-trimethyl-5-aminomethylcyclohexane (IPDA) and/or 4,4'-diaminodicyclohexyl methane (PACM). Most in some embodiments, the compound having at least one primary amine group is 1-amino-3,3,5-trimethyl-5-aminomethylcyclohexane (IPDA).

For example, the NH functional pre-polymer is a reaction product of 1-amino-3,3,5-trimethyl-5-aminomethylcyclohexane (IPDA) and at least one di-substituted maleate and/or di-substituted fumarate and at least one acrylate- and/or methacrylate-containing compound.

It is also possible that the the compound having at least one primary amine group is a polyamine of the following formula (I)

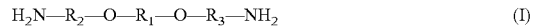

$$H_2N-R_2-O-R_1-O-R_3-NH_2 \qquad (I)$$

wherein R1 represents the residue from a linear or branched hydrocarbon radical having 2 to 15 carbon atoms, in some embodiments 2 to 8 carbon atoms and more in some embodiments 2 to 6 carbon atoms, wherein the carbon atoms may optionally be interrupted by ether groups, R2 and R3 may be the same or different and represent linear or branched hydrocarbon radicals containing 2 to 8 carbon atoms, in some embodiments 2 to 6 carbon atoms and more in some embodiments 2 to 4 carbon atoms.

Examples include 2-[2-(2-aminoethoxy)ethoxy]ethylamine (e.g. Jeffamine XTJ-504, available from Huntsman), 3-[2-(3-aminopropoxy) ethoxy]propylamine (e.g. Etheramine NDPA 10, available from Tomah Products), 3-[3-(3-amino-propoxy)propoxy]propylamine (e.g. Etheramine NDPA 11, available from Tomah Products), 3-[4-(3-aminopropoxy)butoxy]propylamine (e.g. Etheramine NDPA 12, available from Tomah Products) and 3-{2-[2-(3-aminopropoxy)ethoxy]ethoxy}propylamine (e.g. Etheramine DPA-DEG, available from Tomah Products or BASF TTD, available from BASF).

The NH functional prepolymer is further prepared from at least one di-substituted maleate and/or di-substituted fumarate.

The term "at least one" di-substituted maleate and/or di-substituted fumarate in the meaning of the present disclosure means that the respective di-substituted maleate and/or di-substituted fumarate include(s), in some embodiments consist(s) of, one or more kinds of the di-substituted maleate and/or di-substituted fumarate.

For example, the at least one di-substituted maleate and/or di-substituted fumarate is/are one kind of di-substituted maleate and/or di-substituted fumarate. Alternatively, the at least one di-substituted maleate and/or di-substituted fumarate include(s), in some embodiments consist(s) of, two or more kinds of di-substituted maleate and/or di-substituted fumarate. For example, the at least one di-substituted maleate and/or di-substituted fumarate include(s), in some embodiments consist(s) of, two or three kinds of di-substituted maleate and/or di-substituted fumarate.

In some embodiments, the at least one di-substituted maleate and/or di-substituted fumarate is/are one kind of a di-substituted maleate and/or di-substituted fumarate.

In one embodiment of the present disclosure, the NH functional pre-polymer is a reaction product of a compound having at least one primary amine group and at least one di-substituted maleate and di-substituted fumarate and at least one acrylate- and/or methacrylate-containing compound. Alternatively, the NH functional pre-polymer is a reaction product of a compound having at least one primary amine group and at least one di-substituted maleate or di-substituted fumarate and at least one acrylate- and/or methacrylate-containing compound. For example, the NH functional pre-polymer is a reaction product of a compound having at least one primary amine group and at least one di-substituted maleate and at least one acrylate- and/or methacrylate-containing compound. Alternatively, the NH functional pre-polymer is a reaction product of a compound having at least one primary amine group and at least one di-substituted fumarate and at least one acrylate- and/or methacrylate-containing compound.

In some embodiments, the NH functional pre-polymer is a reaction product of a compound having at least one primary amine group and at least one di-substituted maleate and at least one acrylate- and/or methacrylate-containing compound.

The term "di-substituted" maleate means that the maleate is substituted with two substituents. The two substituents can be the same or different. In some embodiments, the two substituents are the same.

The term "di-substituted" fumarate means that the fumarate is substituted with two substituents. The two substituents can be the same or different. In some embodiments, the two substituents are the same.

In one embodiment, the at least one di-substituted maleate is di-substituted with an alkyl group and thus is in some embodiments a dialkyl maleate. Alternatively, the at least one di-substituted fumarate is di-substituted with an alkyl group and thus is in some embodiments a dialkyl fumarate.

The term "alkyl" in the meaning of the present disclosure refers to a radical of a saturated aliphatic group, including linear chain alkyl groups and branched chain alkyl groups which are composed of carbon and hydrogen. In other words, "dialkyl maleate" is composed of maleate and two radicals of a saturated aliphatic group, including linear chain alkyl groups and branched chain alkyl groups. "Dialkyl fumarate" is composed of fumarate and two radicals of a saturated aliphatic group, including linear chain alkyl groups and branched chain alkyl groups.

The dialkyl maleate is in some embodiments selected from the group including dimethyl maleate, diethyl maleate, di-n-butyl maleate, di-iso-butyl maleate, di-tert-butyl maleate, diamyl maleate, di-n-octyl maleate, dilauryl maleate and mixtures thereof. More in some embodiments, the dialkyl maleate is diethyl maleate.

Alternatively, if the di-substituted fumarate is a dialkyl fumarate, the dialkyl fumarate is in some embodiments selected from the group including dimethyl fumarate, diethyl fumarate, di-n-butyl fumarate, di-iso-butyl fumarate, di-tert-butyl fumarate, diamyl fumarate, di-n-octyl fumarate, dilauryl fumarate, and mixtures thereof. More in some embodiments, the dialkyl fumarate is diethyl fumarate.

In one embodiment, the at least one di-substituted maleate is di-substituted with a cycloalkyl group and thus is in some embodiments a dicycloalkyl maleate. Alternatively, the at least one di-substituted fumarate is di-substituted with a cycloalkyl group and thus is in some embodiments a dicycicoalkyl fumarate.

The term "cycloalkyl" in the meaning of the present disclosure refers to a radical of a saturated alicyclic group which is composed of carbon and hydrogen. In other words, "dicycloalkyl maleate" is composed of maleate and two radicals of a saturated alicyclic group. "Dicycloalkyl fumarate" is composed of fumarate and two radicals of a saturated alicyclic group.

The dicycloalkyl maleate is in some embodiments selected from the group including dicyclohexyl maleate, di-tert-butylcyclohexyl maleate and mixtures thereof. More in some embodiments, the dicycloalkyl maleate is dicyclohexyl maleate.

Alternatively, if the di-substituted fumarate is a dicycloalkyl fumarate, the dicycloalkyl fumarate is in some embodiments selected from the group including dicyclohexyl fumarate, di-tert-butylcyclohexyl fumarate and mixtures thereof. More in some embodiments, the dicycicoalkyl fumarate is dicyclohexyl fumarate.

In one embodiment, the at least one di-substituted maleate is di-substituted with an aryl group and thus is in some embodiments a diaryl maleate. Alternatively, the at least one di-substituted fumarate is di-substituted with an aryl group and thus is in some embodiments a diaryl fumarate.

The term "aryl" in the meaning of the present disclosure refers to a radical of a group containing one or more 6-membered unsaturated hydrocarbon rings, wherein the unsaturation may be represented formally by three conjugated double bonds and which may optionally be substituted at one or more carbon atoms of such rings by independently selected alkyl groups. In other words, "diaryl maleate" is composed of maleate and two radicals of a group containing one or more 6-membered unsaturated hydrocarbon rings, wherein the unsaturation may be represented formally by three conjugated double bonds and which may optionally be substituted at one or more carbon atoms of such rings by independently selected alkyl groups. "Diaryl fumarate" is composed of fumarate and two radicals of a group containing one or more 6-membered unsaturated hydrocarbon rings, wherein the unsaturation may be represented formally by three conjugated double bonds and which may optionally be substituted at one or more carbon atoms of such rings by independently selected alkyl groups.

The diaryl maleate is in some embodiments selected from the group including diphenyl maleate, dibenzyl maleate and mixtures thereof. More in some embodiments, the diaryl maleate is diphenyl maleate.

Alternatively, if the di-substituted fumarate is a diaryl fumarate, the diaryl fumarate is in some embodiments selected from the group including diphenyl fumarate, dibenzyl fumarate, and mixtures thereof. More in some embodiments, the diaryl fumarate is diphenyl fumarate.

In one embodiment, the NH functional pre-polymer is a reaction product of a compound having at least one primary amine group and diethyl maleate and/or diethyl fumarate and at least one acrylate- and/or methacrylate-containing compound. For example, the NH functional pre-polymer is a reaction product of a compound having at least one primary amine group and diethyl maleate and diethyl fumarate and at least one acrylate- and/or methacrylate-containing compound. Alternatively, the NH functional pre-polymer is a reaction product of a compound having at least one primary amine group and diethyl maleate or diethyl fumarate and at least one acrylate- and/or methacrylate-containing compound. In some embodiments, the NH functional pre-polymer is a reaction product of a compound having at least one primary amine group and diethyl maleate and at least one acrylate- and/or methacrylate-containing compound.

In one embodiment, the NH functional pre-polymer is a reaction product of 1-amino-3,3,5-trimethyl-5-aminomethylcyclohexane (IPDA) and diethyl maleate and at least one acrylate- and/or methacrylate-containing compound.

The NH functional pre-polymer is further prepared from at least one acrylate- and/or methacrylate-containing compound.

The term "at least one" acrylate- and/or methacrylate-containing compound in the meaning of the present disclosure means that the respective acrylate- and/or methacrylate-containing compound include(s), in some embodiments consist(s) of, one or more kinds of the acrylate- and/or methacrylate-containing compound.

For example, the at least one acrylate- and/or methacrylate-containing compound is/are one kind of acrylate- and/or methacrylate-containing compound. Alternatively, the at least one acrylate- and/or methacrylate-containing compound include(s), in some embodiments consist(s) of, two or more kinds of acrylate- and/or methacrylate-containing compound. For example, the at least one acrylate- and/or methacrylate-containing compound include(s), in some embodiments consist(s) of, two or three kinds of acrylate- and/or methacrylate-containing compound.

In some embodiments, the at least one acrylate- and/or methacrylate-containing compound is/are one kind of an acrylate- and/or methacrylate-containing compound.

In one embodiment of the present disclosure, the NH functional pre-polymer is a reaction product of a compound having at least one primary amine group and at least one di-substituted maleate and/or di-substituted fumarate and at least one acrylate- and methacrylate-containing compound. Alternatively, the NH functional pre-polymer is a reaction product of a compound having at least one primary amine group and at least one di-substituted maleate and/or di-substituted fumarate and at least one acrylate- or methacrylate-containing compound. For example, the NH functional pre-polymer is a reaction product of a compound having at least one primary amine group and at least one di-substituted maleate and/or di-substituted fumarate and at least one acrylate-containing compound. Alternatively, the NH functional pre-polymer is a reaction product of a compound having at least one primary amine group and at least one di-substituted maleate and/or di-substituted fumarate and at least one methacrylate-containing compound.

In some embodiments, the NH functional pre-polymer is a reaction product of a compound having at least one primary amine group and at least one di-substituted maleate and/or di-substituted fumarate and at least one acrylate-containing compound.

The acrylate- and/or methacrylate-containing compound may be a mono(meth)acrylate, di(meth)acrylate or poly (meth)acrylate. In some embodiments, the acrylate- and/or methacrylate-containing compound is a mono(meth)acrylate.

For example, if the acrylate- and/or methacrylate-containing compound is a mono(meth)acrylate, the mono(meth) acrylate is in some embodiments selected from the group including methyl(meth)acrylate, ethyl(meth)acrylate, propyl (meth)acrylate, butyl(meth)acrylate, isobutyl(meth)acrylate, sec.-butyl(meth)acrylate, tert.-butyl(meth)acrylate, cyclohexyl(meth)acrylate, 2-ethylhexyl(meth)acrylate, isooctyl (meth)acrylate, isodecyl(meth)acrylate, lauryl(meth)acrylate, stearyl(meth)acrylate, isobornyl(meth)acrylate, tert-butylcyclohexyl(meth)acrylate, hydroxyethyl(meth) acrylate, hydroxypropyl(meth)acrylate, 2-hydroxybutyl (meth)acrylate, 4-hydroxybutyl(meth)acrylate, adducts of hydroxy(meth)acrylates with lactones, such as the adducts of hydroxyethyl(meth)acrylate with ε-caprolactone, adducts-reaction products of epoxyethers and/or epoxyesters with (meth)acrylic acid, itaconic acid, and mixtures thereof. More in some embodiments, the mono(meth)acrylate is selected from the group including methyl(meth)acrylate, ethyl(meth)acrylate, propyl(meth)acrylate, butyl(meth)acrylate, isobutyl(meth)acrylate, sec.-butyl(meth)acrylate, tert.-butyl(meth)acrylate, cyclohexyl(meth)acrylate, 2-ethylhexyl(meth)acrylate, isooctyl(meth)acrylate and mixtures thereof. Even more in some embodiments, the mono(meth) acrylate is selected from the group including methyl(meth) acrylate, ethyl(meth)acrylate, propyl(meth)acrylate, butyl (meth)acrylate and mixtures thereof. Most in some embodiments, the mono(meth)acrylate is methyl(meth)acrylate or ethyl(meth)acrylate such as methylacrylate.

If the acrylate- and/or methacrylate-containing compound is a di(meth)acrylate, the di(meth)acrylate is in some embodiments selected from the group including ethyleneglycol di(meth)acrylate, propyleneglycol di(meth)acrylate, 1,4-butanediol di(meth)acrylate, 1,6-hexanediol di(meth)acrylate, cyclohexanedimethanol di(meth)acrylate, and mixtures thereof. More in some embodiments, the di(meth) acrylate is selected from the group including ethyleneglycol di(meth)acrylate, propyleneglycol di(meth)acrylate and mixtures thereof. Most in some embodiments, the di(meth) acrylate is selected from the group including ethyleneglycol di(meth)acrylate such as ethyleneglycol diacrylate.

If the acrylate- and/or methacrylate-containing compound is a poly(meth)acrylate, the poly(meth)acrylate is in some embodiments selected from the group including tri(meth) acrylates such as trimethylolpropane tri(meth)acrylate, trimethylolethane tri (meth)acrylate, glycerine tri(meth)acrylate, and mixtures thereof; tetra(meth)acrylates such as pentaerythritol tetra(meth)acrylate and mixtures thereof; penta (meth)acrylates, hexa(meth)acrylates such as dipentaerythritol hexa(meth)acrylate, and mixtures thereof.

In one embodiment, the NH functional pre-polymer is a reaction product of a compound having at least one primary amine group and at least one di-substituted maleate and/or di-substituted fumarate and methylacrylate and/or methylmethacrylate. For example, the NH functional pre-polymer is a reaction product of a compound having at least one primary amine group and at least one di-substituted maleate and/or di-substituted fumarate and methylacrylate and methylmethacrylate. Alternatively, the NH functional pre-polymer is a reaction product of a compound having at least one primary amine group and diethyl maleate or diethyl fumarate and methylacrylate or methylmethacrylate. In some embodiments, the NH functional pre-polymer is a reaction product of a compound having at least one primary amine group and at least one di-substituted maleate and/or di-substituted fumarate and methylacrylate.

In one embodiment, the NH functional pre-polymer is a reaction product of 1-amino-3,3,5-trimethyl-5-aminomethylcyclohexane (IPDA) and diethyl maleate and methylacrylate.

It is appreciated that the NH functional pre-polymer may still include primary amine groups which have not been converted to NH groups. It is thus exemplary that the NH functional pre-polymer has an equivalent ratio of NH groups to NH2 groups in the range from 100:0 to 50:50, more in some embodiments from 99:1 to 60:40, even more in some embodiments from 99:1 to 70:30 and most in some embodiments from 98:2 to 80:20 or from 98:2 to 90:10.

It is a further requirement of the present disclosure that the molar ratio of the at least one di-substituted maleate and/or di-substituted fumarate to the at least one acrylate- and/or methacrylate-containing compound in the NH functional pre-polymer is from 1:10 to 10:1. More in some embodiments, the molar ratio of the at least one di-substituted maleate and/or di-substituted fumarate to the at least one acrylate- and/or methacrylate-containing compound in the NH functional pre-polymer is from 1:5 to 5:1. Most in some embodiments, the molar ratio of the at least one di-substituted maleate and/or di-substituted fumarate to the at least one acrylate- and/or methacrylate-containing compound in the NH functional pre-polymer is from 1:2 to 2:1.

Additionally, the NH functional pre-polymer may be obtained by reacting the compound having at least one primary amine group with the at least one di-substituted maleate and/or di-substituted fumarate in an equivalent ratio of di-substituted maleate and/or di-substituted fumarate to the compound having at least one primary amine group from 1:10 to 1:1. In some embodiments, the NH functional pre-polymer has been obtained by reacting the compound having at least one primary amine group with the at least one di-substituted maleate and/or di-substituted fumarate in an equivalent ratio of di-substituted maleate and/or di-substituted fumarate to the compound having at least one primary amine group from 1:5 to 1:1. Most in some embodiments, the NH functional pre-polymer has been obtained by reacting the compound having at least one primary amine group with the at least one di-substituted maleate and/or di-substituted fumarate in an equivalent ratio of di-substituted maleate and/or di-substituted fumarate to the compound having at least one primary amine group from 1:3 to 1:1.5.

The NH functional pre-polymer can be obtained by reacting the compound having at least one primary amine group and the at least one di-substituted maleate and/or di-substituted fumarate and the at least one acrylate- and/or methacrylate-containing compound in any order.

For example, the NH functional pre-polymer has been obtained by first reacting the compound having at least one primary amine group with the at least one di-substituted maleate and/or di-substituted fumarate and then reacting the obtained mixture with the at least one acrylate- and/or methacrylate-containing compound. Alternatively, the NH functional pre-polymer has been obtained by first reacting the compound having at least one primary amine group with the at least one acrylate- and/or methacrylate-containing compound and then reacting the obtained mixture with the at least one di-substituted maleate and/or di-substituted fumarate. Alternatively, the NH functional pre-polymer has been obtained by first reacting the at least one acrylate- and/or methacrylate-containing compound with the at least one di-substituted maleate and/or di-substituted fumarate and then reacting the obtained mixture with the compound having at least one primary amine group.

Especially good results with regard to the optical properties such as the color stability are obtained if the NH functional pre-polymer has been obtained by first reacting the compound having at least one primary amine group with the at least one di-substituted maleate and/or di-substituted fumarate and then reacting the obtained mixture with the at least one acrylate- and/or methacrylate-containing compound.

The NH functional pre-polymer is in some embodiments prepared in known manner by reacting the corresponding at least one compound having at least one primary amine group and at least one di-substituted maleate and/or di-substituted fumarate and at least one acrylate- and/or methacrylate-containing compound. For example, the preparation of the NH functional pre-polymer from the above mentioned starting materials is carried out, for example, at a temperature of <150° C., such as from 0 to 150° C., using the starting materials in such proportions that the NH functional pre-polymer is obtained as reaction product. In some embodiments, the preparation of the NH functional pre-polymer from the above mentioned starting materials is carried out at a temperature of <100° C., such as from 0 to 100° C., and most in some embodiments of <70° C., such as from 10 to 70° C. Excess of starting materials can be removed by distillation after the reaction. The reaction may be carried out solvent-free or in the presence of suitable organic solvents.

One requirement of the present disclosure is that the NH functional pre-polymer is reacted with at least one polyisocyanate such as to obtain the polyisocyanate chain extended NH functional pre-polymer as reaction product.

It is appreciated that the properties of the polyisocyanate chain extended NH functional pre-polymer are especially well-balanced with regard to the drying performance, mechanical properties and optical properties in case the polyisocyanate chain extended NH functional pre-polymer has been obtained by reacting the NH functional pre-polymer with the at least one polyisocyanate in a specific ratio. For example, the polyisocyanate chain extended NH functional pre-polymer has been obtained by reacting the NH functional pre-polymer with the at least one polyisocyanate in an equivalent ratio of NH and unreacted NH2 groups in the mixture to equivalents of NCO groups from 2.0:0.2 to 2.0:1.8 and more in some embodiments from 2.0:0.4 to 2.0:1.

As already described for the NH functional pre-polymer, it is appreciated that the polyisocyanate chain extended NH functional pre-polymer may still include primary amine groups which have not been converted to NH groups. It is thus exemplary that the polyisocyanate chain extended NH functional pre-polymer has an equivalent ratio of NH groups to NH2 groups in the range from 100:0 to 50:50, more in some embodiments from 99:1 to 60:40, even more in some embodiments from 99:1 to 70:30 and most in some embodiments from 98:2 to 80:20 or from 98:2 to 90:10.

In one embodiment of the present disclosure, the at least one polyisocyanate is one kind of a polyisocyanate. Alternatively, the at least one polyisocyanate includes, in some embodiments consists of, two or more kinds of polyisocyanate. For example, the at least one polyisocyanate includes, in some embodiments consists of, two or three kinds of polyisocyanates.

In some embodiments, the at least one polyisocyanate is one kind of a polyisocyanate.

The at least one polyisocyanate can be any kind of organic polyisocyanates with aliphatically, cycloaliphatically, araliphatically and/or aromatically bound free isocyanate groups. The at least one polyisocyanate is in some embodiments liquid at room temperature or become liquid through the addition of organic solvents.

In one embodiment of the present disclosure, the at least one polyisocyanate has an average NCO functionality from 1.5 to 6.0. In some embodiments, the at least one polyisocyanate has an average NCO functionality from 1.8 to 4.0 and most in some embodiments of about 2.0.

The at least one polyisocyanate suitable for preparing the chain extended NH functional prepolymer is in some embodiments selected from the group including 1-isocyanato-3,3,5-trimethyl-5-isocyanatomethyl-cyclohexane (IPDI), 1,5-pentane diisocyanate, 4,4'-diisocyanatocyclohexylmethane, cyclotrimers, urethdione dimers and/or biurets of 1-isocyanato-3,3,5-trimethyl-5-isocyanatomethyl-cyclohexane, hexamethylene diisocyanate (HDI), and their derivatives, 1,1',6,6'-tetramethyl-hexamethylene diisocyanate, p- or m-tetramethylxylylene diisocyanate, 2,2',5 trimethylhexane diisocyanate, aromatic polyisocyanates such as toluenediisocyanate, diphenylmethanediisocyanate; and mixtures thereof and reaction products thereof.

Examples of particularly suitable polyisocyanates are based on hexamethylene diisocyanate (HDI), 1-isocyanato-3,3,5-trimethyl-5-isocyanatomethyl-cyclohexane (IPDI) and/or bis(isocyanatocyclohexyl)-methane, 4,4'-isocyanato dicyclohexylmethane, 1,5-pentanediisocyanate and the derivatives known per se, containing biuret, allophanate, urethane and/or isocyanurate groups of these diisocyanates.

In one embodiment, the at least one polyisocyanate is in some embodiments a diisocyanate.

Thus, the at least one polyisocyanate is in some embodiments hexamethylene diisocyanate (HDI) and/or 1-isocyanato-3,3,5-trimethyl-5-isocyanatomethyl-cyclohexane (IPDI) and/or 4,4'-isocyanato dicyclohexylmethane and/or 1,5-pentanediisocyanate. For example, the at least one polyisocyanate is hexamethylene diisocyanate (HDI) or 1-isocyanato-3,3,5-trimethyl-5-isocyanatomethyl-cyclohexane (IPDI) or 4,4'-isocyanato dicyclohexylmethane or 1,5-pentanediisocyanate. Most in some embodiments, the at least one polyisocyanate is 1-isocyanato-3,3,5-trimethyl-5-isocyanatomethyl-cyclohexane (IPDI).

In order to obtain a chain extended NH functional prepolymer with especially well-balanced drying performance, mechanical properties and optical properties it is one requirement of the present disclosure that the polyisocyanate chain extended NH functional prepolymer is free of isocyanate groups. Furthermore, it is required that the polyisocyanate chain extended NH functional pre-polymer has an NH equivalent weight of from 300 to 5,000 g. In some embodiments, the polyisocyanate chain extended NH functional pre-polymer has an NH equivalent weight of from 500 to 2,500 g.

The polyisocyanate chain extended NH functional prepolymer is in some embodiments prepared in known manner by reacting the corresponding at least one polyisocyanate with the NH functional pre-polymer. For example, the preparation of the polyisocyanate chain extended NH functional pre-polymer from the above mentioned starting materials is carried out, for example, at a temperature of from 0 to 150° C. using the starting materials in such proportions that the polyisocyanate chain extended NH functional pre-polymer is obtained as reaction product. Excess of starting materials can be removed by distillation after the reaction. The reaction may be carried out solvent-free or in the presence of suitable organic solvents.

It is appreciated that the coating composition can include at least one curing agent having free isocyanate groups.

In some embodiments, the coating composition includes at least one curing agent having free isocyanate groups.

In one embodiment of the present disclosure, the at least one curing agent having free isocyanate groups is one kind of a curing agent. Alternatively, the at least one curing agent having free isocyanate groups includes, in some embodiments consists of, two or more kinds of curing agents. For example, the at least one curing agent having free isocyanate groups includes, in some embodiments consists of, two or three kinds of curing agents.

In some embodiments, the at least one curing agent having free isocyanate groups is one kind of a curing agent.

The at least one curing agent having free isocyanate groups suitable for the coating composition is in some embodiments at least one polyisocyanate.

The curing agent having free isocyanate groups can be any organic polyisocyanate with aliphatically, cycloaliphatically, araliphatically and/or aromatically bound free isocyanate groups.

The exemplary curing agent having free isocyanate groups are a polyisocyanate or polyisocyanate mixtures with exclusively aliphatically and/or cycloaliphatically bound isocyanate groups with an average NCO functionality of 1.5 to 6.0, in some embodiments 1.8 to 4.0.

For example, the at least one curing agent having free isocyanate groups suitable for the coating composition is in some embodiments selected from the group including 1,5-pentane diisocyanate, hexamethylene diisocyanate (HDI), 1-isocyanato-3,3,5-trimethyl-5-isocyanatomethyl-cyclohexane (IPDI), bis(isocyanatocyclohexyl)-methane and their derivatives, 1,1,6,6-tetramethyl-hexamethylene diisocyanate, p- or m-tetramethylxylylene diisocyanate, 2,2',5 trimethylhexane diisocyanate, aromatic diisocyanates and their adducts, and mixtures thereof and reaction products thereof. More in some embodiments, the at least one curing agent having free isocyanate groups is selected from the group including hexamethylene diisocyanate (HDI), 1-isocyanato-3,3,5-trimethyl-5-isocyanatomethyl-cyclohexane (IPDI), 2,2',5 trimethylhexane diisocyanate and mixtures thereof. Most in some embodiments, the at least one curing agent having free isocyanate groups is hexamethylene diisocyanate (HDI) or 1-isocyanato-3,3,5-trimethyl-5-isocyanatomethyl-cyclohexane (IPDI), such as 1-isocyanato-3,3,5-trimethyl-5-isocyanatomethyl-cyclohexane (IPDI).

In principle, diisocyanates can be converted by the usual processes to higher functional compounds, for example, by trimerization or by reaction with water or polyols, such as, for example, trimethylolpropane or glycerine. Thus, the at least one curing agent having free isocyanate groups can also be used in the form of its reaction product such as isocyanate-modified resins or isocyanate-functional prepolymers. Generally, the at least one curing agent having free isocyanate groups can be isocyanurates, uretdione diisocyanates, biuret group-containing polyisocyanates, urethane group-containing polyisocyanates, allophanate group-containing polyisocyanates, polyester and polyether containing polyisocyanates, polyacrylic containing polyisocyanates, carbodiimide group containing polyisocyanates and polyisocyanates containing acylurea groups.

The at least one curing agent having free isocyanate groups can be used individually or in combination with one another. The at least one curing agent having free isocyanate groups is in some embodiments one commonly used in the paint industry. They are described in detail in the literature and are also commercially available.

Typically, following production, the reaction products of the at least one curing agent having free isocyanate groups are freed from surplus parent diisocyanate, in some embodiments by distillation, with only a residue content of less than 0.5% by weight. Triisocyanates, such as triisocyanatononan can also be used.

It is appreciated that the at least one polyisocyanate used for preparing the chain extended NH functional prepolymer and the at least one curing agent having free isocyanate groups can be the same or different. In one embodiment of the present disclosure, the at least one polyisocyanate used for preparing the chain extended NH functional prepolymer and the at least one curing agent having free isocyanate groups are the same.

The isocyanate groups of the at least one curing agent having free isocyanate groups may be completely or partially, in some embodiments partially, blocked. Low molecular weight compounds containing active hydrogen for blocking NCO groups are known. Examples of those blocking agents are aliphatic or cycloaliphatic alcohols, dialkylamino alcohols, oximes, lactams, imides, hydroxyalkyl esters and esters, heterocyclic N containing 5 and 6 membered derivatives like imidazoles, pyrazoles of malonic or acetoacetic acid.

The coating composition can be in the form of a one-component coating composition or two-component coating composition.

In some embodiments, the coating composition is a two-component coating composition. In other words, the components which are reactive towards one another, namely the chain extended NH functional pre-polymer and the at least one curing agent having free isocyanate groups, must be stored separately from one another prior to application in order to avoid a premature reaction. Generally, the polyisocyanate chain extended NH functional pre-polymer and the at least one curing agent having free isocyanate groups may only be mixed together shortly before application. The term "shortly before application" is well-known to a person skilled in the art. The time period within which the ready-to-use coating composition may be prepared prior to the actual use/application depends, e.g., on the potlife of the coating composition. Compositions with very short potlife may be applied by two-component spray guns, where the reactive components are separately fed into a static mixer and applied directly afterwards.

In some embodiments, the chain extended NH functional pre-polymer, and the at least one curing agent having free isocyanate groups are formulated together in one composition.

Either transparent or pigmented colored coating compositions can be produced. Therefore, the coating compositions according to the disclosure are suited for use as clear coats but can be pigmented with conventional pigments and used as pigmented topcoats, basecoats or undercoats such as sealer, primer or primer surfacer. They can be used to coat a substrate with a single coat or within a multilayer coating of substrates. Use as clear coat and colored pigmented topcoat is exemplary, in particular in a multilayer coating.

It is appreciated that the coating composition of the present disclosure in some embodiments includes further compounds as additives. For example, the instant coating composition further includes at least one compound selected from the group including curing catalysts, antioxidants, additives, pigments, extenders, UV absorbers/stabilizers (HALS derivatives), compounds with at least one alkoxy silane group and/or at least one epoxy group, hydroxyl functional binders (as acrylics, polyesters, polyethers, polyurethanes, alkyds), inorganic rheology control agents such as silica's and organic sag control agents based on polyurea and/or polyamide, and mixtures thereof.

In one embodiment of the disclosure, the coating composition includes at least one compound containing at least one alkoxy silane group and/or at least one epoxy group. For example, the coating composition includes at least one compound containing at least one alkoxy silane group and at least one epoxy group. In some embodiments, the at least one compound containing at least one alkoxy silane group and/or at least one epoxy group is not a polyaspartic acid ester and is not a polyisocyanate. The compound containing at least one alkoxy silane group and/or at least one epoxy group is in some embodiments a monomeric compound. Examples of said compound are compounds having at least one alkoxy silane group corresponding to Formula (II)

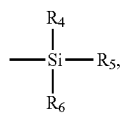
(II)

wherein R4, R5, R6 are the same or different organic groups with 1 to 30 carbon atoms per molecule, provided that at least one of the residues R4, R5 and R6 is an alkoxy group with 1 to 4 carbon atoms.

The compound containing at least one alkoxy silane group and/or at least one epoxy group in some embodiments contains in addition to the alkoxy silane group at least one epoxy group. In some embodiments the at least one compound containing at least one alkoxy silane group and at least one epoxy group is a compound of the general Formula (III),

(III)

wherein X represents the residues

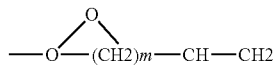

with m being 1-4;

or represents 3,4-epoxycyclohexyl; R4, R5, R6 are the same or different organic residues with 1 to 30 carbon atoms, provided that at least one of the residues R4, R5 and R6 is an alkoxy group with 1 to 4 carbon atoms; and n is 2, 3 or 4, in some embodiments 2 or 3.

Exemplary compounds of the Formula (III) are those in which X is

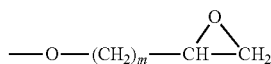

with m being 1 to 4.

Compounds in which R4, R5 and R6 are the same or different alkoxy groups having 1 to 4, in some embodiments 1, 2 or 3 carbon atoms are likewise exemplary. Particularly exemplary alkoxy groups are methoxy, ethoxy and isopropoxy groups.

Examples of particularly suitable epoxy-functional silane compounds of the general Formula (III) are (3-glycidoxypropyl)trimethoxysilane, (3-glycidoxypropyl)triethoxysilane, (3-glycidoxypropyl)triisopropoxysilane, beta-(3,4-epoxycyclohexyl)ethyltrimethoxysilane and beta-(3,4-epoxycyclohexyl).

ethyltriethoxysilane. Silanes with methoxy groups, such as for example (3-glycidoxypropyl)trimethoxysilane and beta-(3,4-epoxycyclohexyl)ethyltrimethoxy-silane are particularly exemplary here.

It is most exemplary to use (3-glycidoxypropyl) trimethoxysilane.

Epoxy-functional silane compounds of Formula (III) which may be used are also obtainable as commercial products, for example under the trade name DYNASILAN® Glymo from Evonik, SILQUEST® A-187 and SILQUEST® A-186 from Momentive.

The compound containing at least one alkoxy silane group and/or at least one epoxy group, specifically the exemplary compounds of Formula (III), can be used in amounts of 0.25 to 5.0% by weight solids, in particular of 1.0 to 3.0% by weight solids and most exemplary of 2.0 to 3.0% by weight solids, relative to the sum of the solids content of the chain-extended aspartate prepolymer and the at least one curing agent having free isocyanate groups being present in the coating composition. If the compound containing at least one alkoxy silane group and/or at least one epoxy group is used in quantities of greater than 5.0% by weight solids this can lead to inferior viscosity and color stability of the multilayer coating. If the compound containing at least one alkoxy silane group and/or at least one epoxy group is used in quantities of less than 0.25% by weight solids the described positive effects, specifically the adhesion effects, may not be achieved.

If the coating composition is in the form of a two-component coating composition, the compound containing at least one alkoxy silane group and/or at least one epoxy group may be present in one of the two components or in both components of the two-component coating system. Most exemplary the compound containing at least one alkoxy silane group and/or at least one epoxy group is present in the polyisocyanate component.

Additionally or alternatively, the coating composition can include an antioxidant, in some embodiments an antioxidant component including A1) at least one sterically hindered phenol antioxidant and/or A2) at least one organophosphite antioxidant. In some embodiments, the coating composition includes an antioxidant, in some embodiments an antioxidant component including A1) at least one sterically hindered phenol antioxidant and A2) at least one organophosphite antioxidant.

Suitable sterically hindered phenol antioxidants A1) include 2,4-dimethyl-6-butylphenol, 4,4'methylene-bis(2, 6-di-tert-butylphenol), 2,6-di-tert. butyl-N,N'dimethyl-amino-p-cresol, butylated hydroxyanisole, 2,6-di-tertbutyl-phenol, 2,4, 6-tri-tertbutylphenol, 2-tert-butylphenol, 2,6-diisopropylphenol, 2-methyl-6-tert-butylphenol, 2,4-dimethyl-6-tertbutylphenol, 4-(N,N-dimethylaminomethyl)-2, 8-di-tertbutylphenol, 4-ethyl-2,6-di-tertbutylphenol. Sterically hindered phenols are also commercially available as antioxidants, for example, under e.g. the trade name Irganox®1010 and Irganox®1135 from BASF.

According to one embodiment the sterically hindered phenol antioxidant includes 3,5-di-tert.-butyl-4-hydroxy toluene, also known as butylated hydroxy toluene or in short "BHT".

Suitable organophosphite antioxidants A2) include those organophosphites known for use as antioxidants. In one embodiment, the organophosphite includes one or more compounds according to the formula (RO)3P, wherein each R is independently alkyl or aryl.

in this regard, the term "alkyl" is a radical of a saturated aliphatic group, including straight chain alkyl groups, branched chain alkyl groups, and cycloalkyl groups, wherein such straight and branched chain alkyl groups may each be optionally substituted with cycloalkyl, such cycloalkyl groups may optionally be substituted with straight or branched chain alkyl groups, and such straight chain alkyl, branched chain alkyl and cycloalkyl groups may each be optionally substituted with aryl, and includes, for example, methyl, ethyl, isopropyl, t-butyl, isodecyl, stearyl, icosyl, cyclohexyl and phenylmethyl.

In this regard, the term "aryl" is a group containing one or more 6-membered unsaturated hydrocarbon rings, wherein the unsaturation may be represented formally by three conjugated double bonds and which may optionally be substituted at one or more carbon atoms of such rings by independently selected alkyl groups, and includes, for example, phenyl, naphthyl, methylphenyl, dimethoxyphenyl, 5-isopropyl-2-methylphenyl, methylphenyl, t-butylphenyl, nonylphenyl.

In one embodiment, each R of formula (RO)3P is independently an alkyl group with 1-30 carbon atoms, e.g. with 5-30 carbon atoms, or an aryl group with 1-30 carbon atoms. Examples of suitable organophosphite antioxidants are trii-sodecylphosphite, diphenylisodecylphosphite, diphenylisooctylphosphite, trilaurylphosphite tributylphosphite, trioctyl phosphite, triphenylphosphite, trinonylphenylphosphite, tributyltripentylphosphite, tris(2, 4-di-tert-butylphenyl)phosphite. In one embodiment, the organophosphite antioxidant includes a trialkyl phosphite, which is, e.g., one wherein each alkyl group has less than 9 carbon atoms, more specifically 3 to 5 carbon atoms. Examples are tri-n-propyl phosphite, tri-isopropyl phosphite, tri-n-pentyl phosphite, tri-butyl phosphites, such as tri-n-butyl, tri-sec-butyl, tri-isobutyl, and tri-tert-butyl phosphite. Each of the three alkyl groups in a given molecule may be the same or different. Each alkyl group may be straight-chained or branched.

If the antioxidant includes an antioxidant component including A1) at least one sterically hindered phenol antioxidant and A2) at least one organophosphite antioxidant, the antioxidant component includes the at least one sterically hindered phenol antioxidant A1) and the at least one organophosphite antioxidant A2) in a ratio by weight of 3.0:0.5 to 0.5:0.3 and in some embodiments of 1:1.

According to one embodiment of the present disclosure, the antioxidant component includes BHT as the at least one sterically hindered phenol antioxidant A1) and at least one organophosphite antioxidant A2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite. According to another embodiment, the antioxidant component includes BHT as the at least one sterically hindered phenol antioxidant A1) and the at least one organophosphite antioxidant A2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite in the above ratio by weight.

Most exemplary the antioxidant component includes BHT and trisnonylphenylphosphite or includes BHT and triphenylphosphite. The antioxidant component can also consist of BHT and trisnonylphenylphosphite or consist of BHT and triphenylphosphite.

If the coating composition includes the antioxidant, in some embodiments the antioxidant component including A1) at least one sterically hindered phenol antioxidant and/or A2) at least one organophosphite antioxidant, the coating composition includes 0.5 to 4.0% by weight, in some embodiments 2.0% by weight of the antioxidant, relative to the total amount of the coating composition.

The coating compositions, according to the disclosure, can further contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica and graphite effect pigments. Examples of fillers are silicon dioxide, barium sulphate, talcum, aluminium silicate and magnesium silicate.

The additives are additives usually used in the paint industry. Examples of such additives are light stabilizers, for example, based on benzotriazoles and HALS (hindered amine light stabilizer) compounds, flow control agents based on (meth)acrylic homopolymers or silicon oils, rheology-influencing agents, in some embodiments inorganic rheology control agents such as silica's and organic sag control agents based on polyurea and/or polyamide, thickeners, such as cross-linked polycarboxylic acid or polyurethanes, compounds with at least one alkoxy silane group and/or at least one epoxy group, hydroxyl functional binders, non-aqueous dispersion, anti-foaming agents and wetting agents. The additives are added in the usual amounts familiar to the person skilled in the art. Pigments, fillers and additives generally used for paint may be used in one and/or both components of the two-component system.

A non-aqueous dispersion includes microparticles included of polymers that contain polar groups (hereinafter referred to as "polar polymeric microparticles"), the microparticles being stably dispersed in a non-aqueous medium by means of a polymeric acrylic dispersant free of polymerizable unsaturation. By "stable" is meant that the polar polymeric microparticles do not settle or precipitate upon standing. The claimed dispersions of polar polymeric microparticles can be prepared by non-aqueous dispersion polymerization proceeding directly in a non-aqueous polar medium. The polymeric microparticles are insoluble in the non-aqueous medium used for polymerization while the polymeric acrylic dispersant is soluble in the non-aqueous medium. Using this method, microparticle materials with very high levels of functionality, e.g., having a functional monomer content of 50 to 100 percent on a molar basis. As a specific example, with a monomer content consisting entirely of acrylic acid, polymeric microparticles having theoretical acid value of 780 can be produced employing the present disclosure. Because the polymerization is conducted directly in a non-aqueous medium, it is not necessary to dry the polar polymeric microparticles and transfer them to a different medium, although this is possible.

The term "polar" as used herein to describe solvents or non-aqueous media means substances that contain polar groups such as hydroxyl groups, carboxyl or other acid groups, carbonyl groups, ether groups, ester groups, amide groups, amino groups, halogenated hydrocarbon groups, nitrile groups, or other such polar groups. Conversely, the term "non-polar" describes substances that are essentially free of polar groups such as those mentioned above.

Polar groups contained in the polar polymeric microparticles of the dispersions include polar functional groups such as carboxylic acid groups, hydroxyl groups, nitrile groups, or mixtures of these polar functional groups.

The polar polymeric microparticles are prepared from a vinyl monomer component including 50 to 100 percent by weight (based on the total weight of monomers in the vinyl monomer component) of: acrylic acid, methacrylic acid, betacarboxyethyl acrylate, 2-hydroxyethyl acrylate, acrylonitrile, or mixtures thereof. The monomers are chosen such that they are soluble in the non-aqueous polar medium in which polymerization is conducted, while the resulting polymer is insoluble.

In some embodiments, the vinyl monomer component is entirely included of the polar functional vinyl monomers listed above or mixtures thereof; however, non-functional vinyl monomers or functional vinyl monomers other than those listed above may be present if the solubility conditions are met. Examples include vinyl ester monomers such as methyl acrylate, methyl methacrylate, n-butyl acrylate, n-butyl methacrylate, and the like: and functional group containing vinyl ester monomers such as 2-hydroxypropyl acrylate, 2-hydroxypropyl methacrylate, 2-hydroxyethyl methacrylate, and the like; or mixtures thereof. If present at all, these monomers may be included in amounts of 0 to 15 percent by weight, in some embodiments 0 to 5 percent, based on the weight of all monomers present.

The polymers of the polar polymeric microparticles may be crosslinked or uncrosslinked. Dispersions of polar polymeric microparticles containing crosslinked polymers are generally exemplary to dispersions of polar polymeric microparticles formed from uncrosslinked polymers because uncrosslinked materials are more likely to swell or dissolve in the organic solvents that are commonly found in many of the coating compositions to which the dispersions are subsequently added. However, in an alternative embodiment of the present disclosure, polar polymeric microparticles of the claimed dispersions may be uncrosslinked. In order to provide for crosslinking, a crosslinking agent is included with the vinyl monomers during polymerization, or added to the reaction product of the vinyl monomers after polymerization. The crosslinker is present in amounts of 0 to 50 percent by weight based on the total weight of monomers used in preparing the polymer, in some embodiments from 5 to 20 percent by weight. When a crosslinker is thus incorporated into the polymer, the crosslinker type and level are usually chosen based on the functional groups present in the polar polymeric microparticles. For example, polyepoxide crosslinkers such as 3,4-epoxy cyclohexylmethyl-3,4-epoxy cyclohexane carboxylate, bis(3,4-epoxy cyclohexylmethyl) adipate, 1,3,5-triglycidyl isocyanurate and pentaerythritol tetra(2-glycidyloxycarbonyl cyclohexane carboxylate) are exemplary when the polar polymeric microparticles contain carboxylic acid functionality. When the polar polymeric microparticles contain hydroxyl functionality, polyisocyanate or polyanhydride crosslinkers are exemplary. The polyisocyanate crosslinkers are particularly exemplary.

In another aspect, the present disclosure also relates to a method for coating of a metallic or plastic substrate including the following steps:
a) applying the coating composition as defined herein to at least a portion of a metallic or plastic substrate to be coated, and
b) curing the coating composition of step a).

It is exemplary that the curing of the coating composition is in some embodiments carried out by means of thermal energy.

The coating composition is applied according to step a) of the method to an optionally pre-coated metallic or plastic substrate.

Metallic substrates can be any industrial goods to be coated with one-component coating compositions or two-component coating compositions, in some embodiments two-component coating compositions such as two-component polyurethane coating compositions. Exemplary metallic substrates are vehicle bodies and vehicle body parts. Metallic substrates which may be used are the various materials, e.g. used in industrial coating and vehicle construction, for example, metals, such as, iron, zinc, aluminium, magnesium, stainless steel or the alloys thereof.

Plastic substrates can be any industrial goods to be coated with one-component coating compositions or two-component coating compositions, in some embodiments two-component coating compositions such as two-component polyurethane coating compositions. Exemplary plastic substrates are vehicle bodies and vehicle body parts. Plastic substrates which may be used are the various materials, e.g. used in industrial coating and vehicle construction, for example, polypropylene (PP), polyethylene (PE), polyurethane (PU), polyester (PES), polyamide (PA), poly(meth)acrylate, thermoplastic olefin such as blends of polypropylene (PP) and ethylene/propylene-diene rubber (EPDM), polycarbonate (PC), acrylonitrile butadiene styrene (ABS) and blends thereof such as blends of acrylonitrile butadiene styrene (ABS) and polycarbonate (PC) or blends of polycarbonate (PC) and polybutylene terephthalate (PBT), sheet moulding compound (SMC), blends of poly(phenylene oxide) (PPO) and polyamide (PA) and mixtures thereof.

The coating composition may be applied by conventional application methods. Examples of application methods are brushing, roller application, knife coating, dipping and spraying. Spray application is exemplary. After an optional flash-off phase, the coating layers may then be cured or the next coating layer is applied.

In some embodiments, the applied coating composition is cured for example, at temperatures of from −20 to 150° C., in some embodiments from −10 to 150° C., more in some embodiments from 0 to 150° C. and most in some embodiments from 10 to 150° C. such as from 10 to 140° C. For example, if the coating composition is in the form of a one-component coating composition, the applied coating composition is cured for example, at temperatures of from −20 to 150° C., in some embodiments from 0 to 150° C., more in some embodiments from 20 to 150° C. and most in some embodiments from 50 to 150° C. such as from 80 to 140° C. For example, if the coating composition is in the form of a two-component coating composition, the applied coating composition is cured for example, at temperatures of from −20 to 150° C., in some embodiments from −10 to 110° C., more in some embodiments from 0 to 90° C. and most in some embodiments from 10 to 70° C. such as from 10 to 50° C. Even if not exemplary lower curing temperatures may also be used, but would lead to longer curing times. The coating composition can alternatively even be cured at higher temperatures of, for example, above 150° C. It is appreciated that higher temperatures, e.g. of above 80° C., are in some embodiments used for two-component coating compositions in case the coating composition is stable at room temperature.

The method in some embodiments includes applying multiple layers of coating compositions to at least a portion of a metallic or plastic substrate. In this regard, it is appreciated that at least one layer, in some embodiments one layer, of the multiple layers includes the instant coating composition. Accordingly, the further layers of the multiple layers can also include the instant coating composition or a coating composition differing from the instant coating composition. Thus, the instant coating composition can be adjacent to the metallic or plastic substrate, or the optional pre-coat, or an intercoat (or interlayer) of the multiple layer structure or the outer layer of the multiple layers.

The multiple layers are in some embodiments applied either wet on wet or by first curing one layer before applying the next layer of the multiple layers. If the multiple layers are applied by first curing one layer before applying the next layer of the multiple layers, the one layer is in some embodiments first cured for a sufficient time and at a sufficient temperature before the next layer of the multiple layers is applied. Regarding the curing temperature, it is referred to the temperatures set out above when defining the curing temperature of the applied coating composition.

It is appreciated that the coating composition of the present disclosure features a well-balanced drying performance, i.e. fast curing times at a sufficient potlife, in some embodiments a potlife of at least 30 min at room temperature, mechanical properties such as adhesion and interlayer adhesion in a multi-layer structure, abrasion, chemical and corrosion resistance, and optical properties, such as color stability of the liquid paint.

The coating composition and the method, according to the disclosure, are suitable for automotive and industrial coatings. In the automotive coatings sector, the coatings and the method can be used for coating vehicle bodies and vehicle body parts in both vehicle production line painting and vehicle refinishing, e.g. on-line or in separate booths or spare part painting such as in-, on- or off-line. They can also be used for coating large vehicles and transportation vehicles, such as, trucks, busses and railroad cars, where curing temperatures of from −20 to 150° C., in some embodiments from −10 to 150° C., more in some embodiments from 0 to 150° C. and most in some embodiments from 10 to 150° C., such as from 10 to 140° C., can be used. Most exemplary the coating compositions and the method can be used in vehicle and vehicle part refinishing. For refinishing, curing temperatures of, for example, −10 to 150° C., in some embodiments from 0 to 150° C. and most in some embodiments from 10 to 150° C., such as from 10 to 140° C., are used. Furthermore, the coating composition and the method can be used for coating any industrial goods other than motor vehicles.

The use of the specific polyisocyanate chain extended NH functional pre-polymer particularly offers improved mechanical properties such as adhesion on a metallic substrate and/or adhesion between two adjacent layers of multiple layers as well as improved optical properties such as color stability. Furthermore, it is to be noted that the specific polyisocyanate chain extended NH functional pre-polymer offers a good early hardness. In particular, it is to be noted that coating composition of the present disclosure feature better mechanical properties such as adhesion on a metallic substrate and/or adhesion between two adjacent layers of multiple layers as well as optical properties such as color stability than a coating composition that does not include the polyisocyanate chain extended NH functional pre-polymer.

In view of the advantages obtained, the present disclosure is further directed to the use of the polyisocyanate chain extended NH functional pre-polymer as defined herein for improving the adhesion of a coating composition on a metallic or plastic substrate and/or for improving the adhesion between two adjacent layers of multiple layers, wherein at least one of the adjacent layers includes the polyisocyanate chain extended NH functional pre-polymer. Furthermore, the present disclosure is directed to the use of the coating composition as defined herein in an one-component coating composition or two-component coating composition.

The disclosure will be explained in more detail on the basis of the examples below. All parts and percentages are on a weight basis unless otherwise indicated.

Examples

Measurement Methods

The following measurement methods are used to evaluate the parameters given in the examples and claims.

Hazen Color

The color has been measured in the Hazen scale (based on ASTM D1209) with the BYK LCSIII device.

Viscosity

The viscosity of the resin was determined according to the Höppler method. The measurement is carried out at 25° C. based on DIN 53015.

The viscosity of the activated clear coat was determined with a DIN 4 flow cup at room temperature (20±3° C.). This method is based on DIN 53211.

Potlife

The potlife of the compositions was measured by determining the viscosity (DIN4 cup) increase as a function of time. The potlife is defined as the time required for increasing the initial viscosity by 1.5. The potlife defines the period during which the clear coat composition is still easy to spray.

Hardness

The coating is applied on a glass with a dry film thickness of about 50 micron. The hardness is measured according to the Fischer hardness test (indentation hardness ASTM D1474). The results are expressed in Knoop.

Solids

The weight percentage of solids in the resin was determined by weighing approximately 1 g of sample in an aluminum dish with a diameter of 75 mm containing a paperclip. Then, the dish was placed in an oven at about 105° C. (±1° C.) for about 1 hour and weighed again. The weight percentage of solids was calculated by using the Formula (VI):

% solids=100%×(residue weight/sample weight)  (VI)

The solids were determined by measuring two samples. The given result is thus the average of two samples. The test method is based on DIN EN ISO 3251.

Amine Value

The Amine value was measured on solution (based on DIN 53176). Therefore the sample is diluted in methoxy propanol and subsequently titrated using perchloric acid. The amine value (AV) is calculated with this formula:

$$AV = \frac{V*56.1*c}{E} [mgKOH/g] \quad (V)$$

V=Volume used of perchloric acid (0.1 mol/l) in ml
c=Concentration of perchloric acid
E=Amount of sample in g Adhesion This test method is based on ASTM D2247-92 and ASTM D3359-92A. Dry and wet adhesion have been evaluated with the cross-cut tape test (X-hatch). A grid hatch is made with a manual cross cut tester, where the lines are 1 mm apart from each other (#-hatch). The panels are brushed lightly to remove any detached flakes of coating. To ensure good contact with the film a scotch tape is placed over the grid and rubbed with a rubber eraser to ensure good contact. Within 60 to 120 seconds after application the tape is removed by seizing the free end and pulling it off rapidly back upon itself at an angle as close as possible to an angle of 180 degrees.

The dry adhesion is rated from 0 (total failure) to 10 (no failure) according to the extent of damage, which is described by photographic representations.

For the evaluation of wet adhesion the same method is used but here the panels are placed during 4 days and during 10 days in a humidity cabinet which is at 100% RH and 40° C.

The type of failure has also been evaluated (indicated between brackets):
1: substrate/paint failure
2: primer/topcoat failure
3: basecoat/clear coat failure
4: primer/primer failure
5: primer cohesion failure
6: basecoat cohesion failure Gloss Measured with the micro TRI gloss device from Byk Gardner (Germany). The reflected light is measured at an angle of 20°.

Dullness and DOI (Distinctness of Image)

Measured with a Wavescan-DOI apparatus from Byk Gardner (Germany). Structures smaller than 0.1 mm influence visual perception and therefore, the wavescan DOI measures with a CCD camera the diffused light caused by these fine structures. The parameter measured in this way is referred to as the 'dullness' of the coating. A lower value for dullness is exemplary, with 1 as a minimum.

DOI can also be described with terms like brilliance, sharpness or clarity. DOI is dimished by very fine structures close to the human eye resolution (smaller than 0.3 mm) The higher the DOI, the better.

Materials

The solvent n-butylacetate is commercially available from BASF SE, Germany, Celanese, USA or Oxea GmbH, Germany.

The raw material isophorone diamine is commercially available from Evonik Industries, Germany, BASF SE, Germany or DKSH, China, Switzerland.

The raw material diethylmaleate is commercially available from DSM Fine Chemicals, Austria and Polynt S. p. A., Italy.

The raw material isophoronediisocyanate is commercially available from Evonik Industries, Germany and Bayer MaterialScience AG, Germany.

The raw material methyl acrylate is commercially available from BASF SE, Germany, ECEM, Netherlands and DOW Benelux, Netherlands.

The solvent PGMEA is commercially available from BASF SE, Germany, the Dow Chemical Company, USA or Lyondell Basell, Germany.

The solvent BGA is commercially available from BASF SE, Germany or Ineos Oxide

The UV absorber/stabilizer is commercially available from BASF SE, Germany as Tinuvin 384-2 (benzotriazole UV absorber) and Tinuvin 292 (UV stabilizer).

The silicone additives are commercially available from Byk Chemie GmbH, Germany as Byk 315 and Baysilone OL17 from OMG Borchers. The acrylic additive Byk 361 (from Byk Chemie GmbH, Germany) is also used into the formulation.

EXAMPLES

The following examples illustrate the preparation of chain-extended aspartate pre-polymers and coating compositions including the chain-extended aspartate pre-polymer.

Comparative Example 1: A Bisaspartate of Isophoronediamine and Diethylmaleate

In a reactor equipped with a propeller type of stirrer, a thermometer, condenser and feeding system 204.91 g of isophorone diamine and 34.44 g of n-butylacetate were loaded. The mixture was heated to 30° C. 414.99 g of diethylmaleate and 10.33 g of n-butylacetate were fed to the reactor content over about 4 hours followed by a rinsing step with 10.33 g of n-butylacetate. The reactor temperature was kept at 50° C. max during addition and for 46 hours after the addition was completed.

Test results:

| | |
|---|---|
| Solids (wt.-%) | 82.6 |
| Viscosity (mPa · s) | 58 |
| Color (Hazen) | 47 |
| Amine value (mgKOH/g) | 185 |

Comparative Example 2: Isophorone Diisocyanate Chain Extended Reaction Product of Comparative Example 1

688.78 g of the reaction product of reference example 1 was diluted with 151.62 g of n-butylacetate and heated in the reactor to 40° C. 80.82 g of isophoronediisocyanate mixed with 16.89 g of n-butylacetate were added to the reactor over 1 hour while keeping the reactor at 50° C. max. After a rinsing step with 16.89 g of n-butylacetate, the reactor content was kept at 50° C. till the NCO has disappeared as measured by IR spectrometry. In a dilution step, 45 grams of n-butylacetate were added to the reactor. The results of the end-products are found below.

Test results:

| | |
|---|---|
| Solids (wt.-%) | 67.4 |
| Viscosity (mPa · s) | 71 |
| Color (Hazen) | 31 |
| Amine value (mgKOH/g) | 98 |

Comparative Example 3: A Bisaspartate of Isophoronediamine, Diethylmaleate and Methyl Acrylate In a reactor equipped with a propeller type of stirrer, a thermometer, condenser and feeding funnel 252.36 g of isophorone diamine were loaded. The mixture was heated to 35° C. 255.14 g of diethylmaleate were added to the reactor content over about 4 hours while the temperature was increased to 70° C. At 35° C., 127.58 g of methyl acrylate was added to the reaction mixture. The reactor temperature was kept at 70° C. for 30 hours.

Test results:

| | |
|---|---|
| Solids (wt.-%) | 98.0 |
| Viscosity (mPa · s) | 430 |
| Color (Hazen) | 32 |
| Amine value (mgKOH/g) | 261 |

Inventive Example 4: Isophorone Diisocyanate Chain Extended Reaction Product of Comparative Example 3

In a reactor equipped with a propeller type of stirrer, a thermometer, condenser and feeding funnel 291.63 g of the reaction product of comparative example 3 were loaded and diluted with 48.30 g of n-butylacetate and heated in the reactor to 50° C. Then, 44.37 g of isophoronediisocyanate mixed with 21.00 g of n-butylacetate were added to the reactor over 1 hour while keeping the reactor at 70° C. max. The reactor content was kept at 70° C. for 2 h. In a dilution step, 14.70 g of n-butylacetate were added to the reactor. The results of the end-products are found below.

Test results:

| | |
|---|---|
| Solids (wt.-%) | 79.4 |
| Viscosity (mPa s) | 730 |
| Color (Hazen) | 42 |
| Amine value (mgKOH/g) | 127 |

Example 5: Preparation of Clear Coats Based on Comparative Examples 1, 2 and 3 as Well as Inventive Example 4

The clear coat compositions have been prepared by first activating the products obtained in comparative examples 1, 2 and 3 as well as inventive example 4 with a polyisocyanate activator based on 65% Desmodur®N3390 (Aliphatic polyisocyanate HDI trimer, 90% solids, Bayer), 32.37% n-butylacetate, an epoxy-functional silane (2.4% Silquest®A187 from Momentive), 0.2% para-toluenesulfonyl isocyanate (pTSI 96% from Aldrich) and 0.27% DBTDL catalyst (TINSTAB BL 277 from Akcros Chemicals). The products and the activators have been mixed by hand in a ratio so that the NCO to NH ratio has been kept constant at 1.26. Also the total solid content of the activated mixture has been kept constant at 57 wt.-%, based on the total weight of the mixture.

The clear coats 5A, 5B, 5C and 5D have been formulated with the components as shown in Table 1 below.

TABLE 1

| Clear coat formulations | | | | | |
|---|---|---|---|---|---|
| Component | Type of product | CE5A (wt %) | CE5B (wt %) | CE5C (wt %) | IE5D (wt %) |
| Activated mixture of CE1 | binder | 57.71 | | | |
| Activated mixture of CE2 | binder | | 74.2 | | |
| Activated mixture of CE3 | binder | | | 51.94 | |
| Activated mixture of IE4 | binder | | | | 64.93 |
| n-butylacetate | solvent | 34.32 | 17.83 | 40.09 | 27.1 |
| PGMEA | solvent | 2.1 | 2.1 | 2.1 | 2.1 |
| BGA | solvent | 2 | 2 | 2 | 2 |
| UV protection | UV absorber/ stabilizer | 3.32 | 3.32 | 3.32 | 3.32 |
| Flow & levelling additives | Silicone and acrylic additives | 0.55 | 0.55 | 0.55 | 0.55 |

The spray viscosities have been measured at 20° C. in a DIN4 cup. The results are outlined in Table 2.

From Table 2 it can be gathered that in case of clear coats 5C and 5D, the reactivity is higher than for clear coat 5A, resulting in a shorter potlife. The short potlife is in direct correlation with the higher spray viscosity since addition of extra n-butylacetate to Ref 5C and Disclosure 5D (disclosure 5E & 5F) so that spray viscosity is comparable to Ref 5B, a comparable potlife is obtained as for Ref 5B (Table 3).

TABLE 2

Spray viscosities

| | Clear coat | | | |
|---|---|---|---|---|
| | CE5A (wt %) | CE5B (wt %) | CE5C (wt %) | IE5D (wt %) |
| Gram activator | 83.4 | 52.0 | 100.8 | 61.4 |
| % solids RFU | 57.04 | 56.73 | 57.16 | 56.84 |
| Initial spray viscosity | 12.4" | 13.4" | 18.9" | 16.1" |
| Viscosity after 15 min. | 14" | 14.3" | 28.9" | 19.9" |
| Potlife | 1 h 50 | 1 h 07 | 12' | 35' |

From Table 2, it can be gathered that in case of clear coats CE5C and IE5D, the reactivity is higher than for clear coat CE5A, resulting in a shorter potlife. The short potlife is in direct correlation with the higher spray viscosity due to the addition of extra n-butylacetate to CE5C and IE5D. When using varying amounts of n-butylacetate, it can be gathered that the viscosity is comparable to CE5B (see IE5E and IE5F in table 3) such that a comparable potlife is obtained as for CE5B.

TABLE 3

Spray viscosities by varying amount of solvent

| | Clear coat | |
|---|---|---|
| | IE5E (wt %) | IE5F (wt %) |
| Gram activator | 68.92 | 44.64 |
| Amount n-butylacetate into clear coat | 56.63 | 47.2 |
| % solids RFU | 47.18 | 46.84 |
| Initial spray viscosity | 13.9" | 12.5" |
| Viscosity after 15 min. | 15.2" | 13.2" |
| Potlife | 40-45' | 1 h 15-1 h 30 |

The activated clear coat compositions were sprayed over a glass panel and air dried. The hardness is measured at a dry film thickness of 50 micron according the Fischer hardness test. The results are expressed in Knoop and are outlined in Table 4.

TABLE 4 hardness of the clear coats

| | Clear Coate | | | |
|---|---|---|---|---|
| | CE5A (wt %) | CE5B (wt %) | CE5C (wt %) | IE5D (wt %) |
| Gram activator | 83.4 | 52.0 | 100.8 | 61.4 |
| Fischer hardness 1 hour (Knoop) | 0.69 | 1.28 | 0.42 | 1.56 |
| Fischer hardness 2 hours (Knoop) | 1.24 | 2.03 | 0.57 | 2.1 |
| Fischer hardness 1 day (Knoop) | 7.53 | 7.92 | 6.98 | 8.13 |
| Fischer hardness 2 days (Knoop) | 8.97 | 9.01 | 8.58 | 9.92 |
| Fischer hardness 1 week (Knoop) | 10.15 | 10.21 | 10.25 | 10.52 |

Table 4 clearly shows that the chain extended polymers CE5B and IE5D have an increased initial hardness. However, IE5D has a higher initial and final hardness than the reference CE5B.

Adhesion of the coating has been evaluated after a minimum of 1 week aging at room temperature. The panels were coated with commercially available 1K blue metallic+pearl waterborne basecoat. The results for dry and wet adhesion are presented in Tables 5A and 5B below.

TABLE 5A

Dry adhesion

| | Clear Coat | | | |
|---|---|---|---|---|
| | CE5A (wt %) | CE5B (wt %) | CE5C (wt %) | IE5D (wt %) |
| X-hatch | 10 | 10 | 10 | 10 |
| #-hatch | 10 | 10 | 10 | 10 |
| Gloss 20° | 86 | 85 | 86 | 86 |
| DOI | 94 | 94 | 91 | 92 |
| Dullness | 3.9 | 3.4 | 5.5 | 5.2 |

TABLE 5B

Wet adhesion after 10 days humidity cabinet (100% RH - 40° C.):

| | Clear Coat | | | |
|---|---|---|---|---|
| | CE5A (wt %) | CE5B (wt %) | CE5C (wt %) | IE5D (wt %) |
| X-hatch | 5(6) | 5(6) | 5(6) | 5(6) |
| #-hatch | 2(6) | 7(6) | 10 | 10 |
| Gloss 20° | 76 | 78 | 86 | 86 |
| DOI | 71 | 77 | 87 | 84 |
| Dullness | 31 | 16 | 7 | 11 |
| blistering | Few large ones | Few large ones | none | none |

Tables 5A and 5B clearly demonstrate that the clear coats based on CE5C and IE5D have improved dry and wet adhesion, i.e. improved appearance and no blistering after 10 days humidity cabinet.

Furthermore, the clear coats were applied over a commercially available 1K solid red waterborne (WB) basecoat as well as over a 1K red pearl waterborne basecoat for testing the adhesion. The results for dry and wet adhesion are presented in Tables 6A and 6B below.

TABLE 6A

Dry adhesion

| | Clear Coat | | | | | | | |
|---|---|---|---|---|---|---|---|---|
| | CE5A (wt %) | CE5B (wt %) | CE5C (wt %) | IE5D (wt %) | CE5A (wt %) | CE5B (wt %) | CE5C (wt %) | IE5D (wt %) |
| BC quality | 1K Solid red WB | | | | 1K red pearl WB | | | |
| X-hatch | 10 | 10 | 10 | 10 | 10 | 10 | 10 | 10 |
| #-hatch | 10 | 10 | 10 | 10 | 10 | 10 | 10 | 10 |
| Gloss 20° | 85 | 85 | 87 | 86 | 87 | 86 | 88 | 88 |
| DOI | 95 | 96 | 91 | 93 | 93 | 92 | 87 | 89 |
| Dullness | 1 | 1 | 5 | 3 | 6 | 7 | 11 | 8 |

TABLE 6B

Wet adhesion after 10 days humidity cabinet (100% RH - 40° C.):

| | Clear Coat | | | | | | | |
|---|---|---|---|---|---|---|---|---|
| | CE5A (wt %) | CE 5B (wt %) | CE 5C (wt %) | IE 5D (wt %) | CE 5A (wt %) | CE5B (wt %) | CE 5C (wt %) | IE 5D (wt %) |
| BC quality | 1K Solid red WB | | | | 1K red pearl WB | | | |
| X-hatch | 10 | 8 | 10 | 10 | 0 | 1 | 9 | 6 |
| #-hatch | 10 | 10 | 5 | 10 | 5 | 4 | 10 | 5 |
| Gloss 20° | 86 | 84 | 85 | 84 | 78 | 83 | 84 | 85 |
| DOI | 79 | 79 | 82 | 83 | 70 | 71 | 77 | 76 |
| Dullness | 15 | 14.3 | 10 | 9 | 38 | 38 | 23 | 25 |

As can be gathered from Tables 6A and 6B, IE5D gives the best balance of properties after 10 days humidity cabinet, i.e. improved adhesion in combination with a nice appearance (high gloss, high DOI and low dullness).

The invention claimed is:

1. A coating composition comprising a polyisocyanate chain extended NH functional pre-polymer, wherein the polyisocyanate chain extended NH functional pre-polymer
   a) is free of isocyanate groups,
   b) has an NH equivalent weight of from 300 to 5,000 g, and
   c) consists of a reaction product that is made by reacting a reaction mixture consisting of:
      (c1) at least one polyisocyanate selected from the group consisting of: 1-isocyanato-3,3,5-trimethyl-5-isocyanatomethyl-cyclohexane (IPDI), 1,5-pentane diisocyanate, 4,4'-diisocyanatocyclohexylmethane, hexamethylene diisocyanate (HDI), 1,1',6,6'-tetramethyl-hexamethylene diisocyanate, p- or m-tetramethylxylylene diisocyanate, 2,2',5 trimethylhexane diisocyanate, aromatic polyisocyanates, toluenediisocyanate, diphenylmethanediisocyanate, and mixtures thereof, and
      (c2) a NH functional pre-polymer, and
      (c3) optional solvents and reaction catalysts,
   wherein the NH functional pre-polymer consists of a reaction product that is made by reacting a reaction mixture consisting of:
      (c2.1) a compound having at least one primary amine group that is an arylalkyl diamine selected from the group consisting of: 1,3- and 1,4-cyclohexane diamine, 5-amino-1,3,3-trimethyl-cyclohexanemethanamine (IPDA), norbornyldiamine, 2,4- and 2,6-hexahydrotoluylene diamine, 2,4'- and 4,4'-diamino-dicyclohexyl methane and 3,3'-dialkyl-4, 4'-diaminodicyclohexylmethanes, 3, 3'-dimethyl-4, 4'-diaminodicyclohexyl methane and 3,3'-diethyl-4,4'-diaminodicyclohexylmethane, 1,3- and 1,4 xylylenediamine, tetramethyl xylylenediamine, and mixtures thereof,
      (c2.2) at least one dialkyl maleate selected from the group consisting of: dimethyl maleate, diethyl maleate, di-n-butyl maleate, di-iso-butyl maleate, di-tert-butyl maleate, diamyl maleate, di-n-octyl maleate, dilauryl maleate, and mixtures thereof,
      (c2.3) at least one acrylate- and/or methacrylate-containing compound selected from the group consisting of: methyl(meth)acrylate, ethyl(meth) acrylate, propyl(meth)acrylate, butyl(meth)acrylate, isobutyl(meth)acrylate, sec.-butyl(meth) acrylate, tert.-butyl(meth)acrylate, cyclohexyl (meth)acrylate, 2-ethylhexyl(meth)acrylate, isooctyl(meth)acrylate, isodecyl(meth)acrylate, lauryl(meth)acrylate, stearyl(meth)acrylate, isobornyl(meth)acrylate, tert-butylcyclohexyl (meth)acrylate, and
      (c2.4) optional solvents and reaction catalysts, wherein a molar ratio of the at least one dialkyl maleate to the at least one acrylate- and/or methacrylate-containing compound is from 1:10 to 10:1.

2. The coating composition of claim 1, wherein the NH functional pre-polymer has been obtained by first reacting the compound having at least one primary amine group with the at least one dialkyl maleate and then reacting the obtained mixture with the at least one acrylate- and/or methacrylate-containing compound.

3. The coating composition of claim 1, wherein the NH functional pre-polymer has been obtained by reacting the compound having at least one primary amine group with the at least one dialkyl maleate in an equivalent ratio of dialkyl maleate to the compound having at least one primary amine group from 4:1 to 1:4.

4. The coating composition of claim 3, wherein the polyisocyanate chain extended NH functional pre-polymer
   a) has been obtained by reacting the NH functional pre-polymer with the at least one polyisocyanate in an equivalent ratio of NH and unreacted $NH_2$ groups in the mixture to equivalents of NCO groups from 2.0:0.2 to 2.0:1.8; and
   b) has an equivalent ratio of NH groups to $NH_2$ groups from 100:0 to 50:50.

5. The coating composition of claim 4, wherein the coating composition further comprises at least one curing agent having free isocyanate groups, wherein the at least one curing agent having free isocyanate groups is selected from the group consisting of: 1,5-pentane diisocyanate, hexamethylene diisocyanate (HDI), 1-isocyanato-3,3,5-trimethyl-5-isocyanatomethyl-cyclohexane (IPDI), bis(isocyanatocyclohexyl)-methane, 1,1,6,6-tetramethyl-hexamethylene diisocyanate, p- or m-tetramethylxylylene diisocyanate, 2,2',5 trimethylhexane diisocyanate, aromatic diisocyanates and their adducts, mixtures thereof, and reaction products thereof.

6. The coating composition of claim 1, wherein the coating composition further comprises one or more further ingredients selected from the group consisting of: curing catalysts, antioxidants, additives, pigments, extenders, UV absorbers/stabilizers (HALS derivatives), compounds with at least one alkoxy silane group and/or at least one epoxy group, hydroxyl functional binders, inorganic rheology control agents, organic sag control agents based on polyurea and/or polyamide, and mixtures thereof.

7. The coating composition of claim 5, wherein the coating composition is one component of a two-component coating composition.

8. A method for coating of a metallic or plastic substrate, the method comprising the steps of:
   a) applying a coating composition to at least a portion of a metallic or plastic substrate to be coated, wherein the coating composition comprises a polyisocyanate chain extended NH functional pre-polymer, wherein the polyisocyanate chain extended NH functional pre-polymer
      1) is free of isocyanate groups,
      2) has an NH equivalent weight of from 300 to 5,000 g, and
      3) consists of a reaction product that is made by reacting a reaction mixture consisting of:
         (c1) at least one polyisocyanate selected from the group consisting of: 1-isocyanato-3,3,5-trimethyl-5-isocyanatomethyl-cyclohexane (IPDI), 1,5-pentane diisocyanate, 4,4'-diisocyanatocyclohexylmethane, hexamethylene diisocyanate (HDI), 1,1',6,6'-tetramethyl-hexamethylene diisocyanate, p- or m-tetramethylxylylene diisocyanate, 2,2',5 trimethylhexane diisocyanate, aromatic polyisocyanates, toluenediisocyanate, diphenylmethanediisocyanate, and mixtures thereof, and
         (c2) a NH functional pre-polymer, and
         (c3) optional solvents and reaction catalysts, wherein the NH functional pre-polymer consists of a reaction product that is made by reacting a reaction mixture consisting of:
            (c2.1) a compound having at least one primary amine group that is an arylalkyl diamine selected from the group consisting of: 1,3- and 1,4-cyclohexane diamine, 5-amino-1,3,3-trimethyl-cyclohexanemethanamine (IPDA), norbornyldiamine, 2,4- and 2,6-hexahydrotoluylene diamine, 2,4'- and 4,4'-diamino-dicyclohexyl methane and 3,3'-dialkyl-4, 4'-diaminodicyclohexylmethanes, 3, 3'-dimethyl-4, 4'-diaminodicyclohexyl methane and 3,3'-diethyl-4,4'-diaminodicyclohexylmethane, 1,3- and 1,4 xylylenediamine, tetramethyl xylylenediamine, and mixtures thereof,
            (c2.2) at least one dialkyl maleate selected from the group consisting of: dimethyl maleate, diethyl maleate, di-n-butyl maleate, di-iso-butyl maleate, di-tert-butyl maleate, diamyl maleate, di-n-octyl maleate, dilauryl maleate, and mixtures thereof,
            (c2.3) at least one acrylate- and/or methacrylate-containing compound selected from the group consisting of: methyl(meth)acrylate, ethyl(meth)acrylate, propyl(meth)acrylate, butyl(meth)acrylate, isobutyl(meth)acrylate, sec.-butyl(meth)acrylate, tert.-butyl(meth)acrylate, cyclohexyl(meth)acrylate, 2-ethylhexyl(meth)acrylate, isooctyl(meth)acrylate, isodecyl(meth)acrylate, lauryl(meth)acrylate, stearyl(meth)acrylate, isobornyl(meth)acrylate, tert-butylcyclohexyl (meth)acrylate, and
            (c2.4) optional solvents and reaction catalysts, wherein a molar ratio of the at least one dialkyl maleate to the at least one acrylate- and/or methacrylate-containing compound is from 1:10 to 10:1, and
   b) curing the coating composition applied in step a).

9. The method of claim 8, wherein multiple layers of coating compositions are applied to at least a portion of the metallic or plastic substrate and at least one of the layers comprises the coating composition applied in step a), and the multiple layers are applied either wet on wet or by first curing one layer before applying the next layer of the multiple layers.

10. A coating composition comprising a polyisocyanate chain extended NH functional pre-polymer, wherein the polyisocyanate chain extended NH functional pre-polymer is free of isocyanate groups, has an NH equivalent weight of from 300 to 5,000 g, and consists of a reaction product formed from reactants consisting of: isophoronediisocyanate and a NH functional pre-polymer,
   wherein the NH functional pre-polymer consists of a biaspartate consisting of a reaction product formed from reactants consisting of: isophoronediamine, diethylmaleate, and methyl(meth)acrylate, and
   wherein a molar ratio of the diethylmaleate to the methyl(meth)acrylate in the NH functional pre-polymer is from 1:10 to 10:1.

11. A two-component coating system comprising the coating composition of claim 10 as a first component of the two-component coating system, wherein a second component of the two-component coating system comprises a curing agent having free isocyanate groups.

12. The two-component coating system of claim 11, wherein the second component comprises isophoronediisocyanate.

* * * * *